(12) United States Patent
Federico et al.

(10) Patent No.: US 7,842,172 B2
(45) Date of Patent: Nov. 30, 2010

(54) BIPOLAR PLATE FOR ELECTROLYSER COMPRISING A SINGLE WALL

(75) Inventors: Fulvio Federico, Piacenza (IT); Leonello Carrettin, Milan (IT); Dario Oldani, Milan (IT); Corrado Mojana, Valmadrera (IT)

(73) Assignee: Uhdenora S.p.A., Milan (IT)

( * ) Notice: Subject to any disclaimer, the term of this patent is extended or adjusted under 35 U.S.C. 154(b) by 792 days.

(21) Appl. No.: 11/667,024

(22) PCT Filed: Nov. 18, 2005

(86) PCT No.: PCT/EP2005/012381
§ 371 (c)(1),
(2), (4) Date: May 3, 2007

(87) PCT Pub. No.: WO2006/053768
PCT Pub. Date: May 26, 2006

(65) Prior Publication Data
US 2008/0105540 A1 May 8, 2008

(30) Foreign Application Priority Data
Nov. 19, 2004 (IT) .............................. MI04A2248

(51) Int. Cl.
*C25B 9/08* (2006.01)
*C25B 9/02* (2006.01)
(52) U.S. Cl. ........................ 204/254; 204/255; 204/253; 429/32; 429/36; 429/38; 429/39; 429/34
(58) Field of Classification Search ................. 204/252, 204/253, 254, 255; 429/32, 34, 36, 38, 39
See application file for complete search history.

(56) References Cited

U.S. PATENT DOCUMENTS 2,717,872 A      9/1955   Zdansky
4,518,113 A  *   5/1985   Pellegri ...................... 228/170

(Continued)

FOREIGN PATENT DOCUMENTS

WO       WO 02/068718 A2      9/2002

*Primary Examiner*—Bruce F Bell
(74) *Attorney, Agent, or Firm*—Charles A. Muserlian

(57) ABSTRACT

It is described a bipolar plate consisting of a single wall and a perimetrical sealing frame obtained by folding and provided with a planar abutment surface for the frame-to-wall welding. The wall is further provided with projections on one face thereof preferably obtained by moulding, and with supports on the other face consisting of sheet strips housed in the recesses formed by the concave part of the projections. The projections substantially extend along the entire length of the bipolar plate. The projections and supports are connected to electrodes or current distributors. The projections, the supports, the single wall and the perimetrical frame are made of the same metal or alloy. The electrode or current distributor supported by the projections, the same projections and the supports are welded together by a single pass of arc-welding or preferably laser-welding. The electrode or current distributor connected to the support and the support themselves are mutually welded by a subsequent pass of arc-welding or preferably laser-welding. The welding between wall and perimetrical frame on the abutment surface of the frame is carried out by diode-laser technique, allowing to obtain a robust connection but without a complete melting of the sheet, thereby eliminating the risk of process fluid leakage to the external environment.

26 Claims, 7 Drawing Sheets

U.S. PATENT DOCUMENTS 4,726,891 A     2/1988  Beaver
6,998,030 B2 *  2/2006  Oldani et al.  ............... 204/253

2004/0216994 A1 *  11/2004  Oldani et al. ............ 204/229.4

* cited by examiner

BIPOLAR PLATE FOR ELECTROLYSER COMPRISING A SINGLE WALL

This application is a 371 of PCT/EP2005/012381 filed Nov. 18, 2005.

BACKGROUND OF THE INVENTION

The electrochemical technology is at the basis of several processes of industrial relevance, such as the production of aluminium from molten salts, of copper, zinc, nickel, cobalt and lead from aqueous solutions obtained by leaching of ores, of chlorine and caustic soda from sodium chloride solutions, of chlorine and optionally hydrogen from hydrochloric acid solutions and of hydrogen and oxygen from alkaline or acidic aqueous solutions.

In particular, in the case of chlorine-caustic soda electrolysis:

$$2NaCl + 2H_2O \rightarrow Cl_2 + H_2 + 2NaOH$$

the industrial reactor known as electrolyser consists, in the technologically most advanced version of membrane electrolysis, of an assembly of elementary cells, each formed by two shells provided with perimetrical frames equipped with sealing gaskets, one membrane, two electrodes respectively known as anode and cathode secured to suitable supports and several nozzles for feeding the reactant-containing solutions and for discharging the products and the exhaust solutions. The membrane subdivides the internal volume of each elementary cell into two compartments, respectively the anodic one, containing the first of the two electrodes (anode) or current distributors (anodic) secured to the relevant supports, and the cathodic one containing the first of the two electrodes (cathode) or current distributors (cathodic) also secured to the relevant supports. Since the solutions, the reactants and the products present in the two compartments, being different (respectively sodium chloride solution and chlorine in the anodic compartment and caustic soda solution and hydrogen in the cathodic compartment) are characterised by a substantially different, chemical aggressiveness, the construction materials of the two shells cannot be the same: in particular the anodic shell is built with titanium sheet and the cathodic shell with nickel sheet.

When the single cells are assembled in electrical series to make up the electrolyser, the titanium anodic wall of one cell comes in contact with the nickel cathodic wall of the subsequent cell.

For a correct understanding of the content of the present invention, which will be illustrated in the following paragraphs, it is necessary to remind that from a constructional standpoint each elementary cell may be implemented as an independent unit consisting of a pair of shells, respectively cathodic and anodic, for instance as illustrated in DE 19816334 (constructive concept known to the experts in the field as "single cell").

According to an alternative embodiment the elementary cell does not exist as independent unit, but is generated instead by the matching of suitable elements (known to the experts in the field as bipolar plates) when the electrolyser is assembled, as shown for instance in FIG. 3 of U.S. Pat. No. 4,767,519. In the case of chlorine-caustic soda electrolysis each bipolar plate comprises an anodic shell of titanium and a cathodic shell of nickel coupled in correspondence of the walls, for example by welding. During the assemblage of a similar kind of electrolyser the bipolar plates with the membranes and the perimetrical gaskets intercalated in-between are compressed one against each other: it is in this moment that the matching of the titanium anodic shell with the nickel cathodic shell of the subsequent bipolar plate forms the elementary cells.

In the case of alkaline water electrolysis:

$$2H_2O \rightarrow 2H_2 + O_2$$

the two compartments, anodic and cathodic both contain a potassium hydroxide solution whose aggressiveness is not sensibly influenced by the presence of oxygen in the anodic compartment and of hydrogen in the cathodic one. Hence the two shells delimiting each elementary cell are usually made of the same material, nickel in particular, which is notoriously the metal characterised by best chemical resistance to alkaline solutions. This aspect has no effect at all in case the "single cell" design is adopted, while it brings to substantial constructional cost savings of the bipolar plates: in this case in fact the bipolar plate does not consist anymore of two mutually welded shells, as illustrated in the case of chlorine-caustic soda electrolysis, but rather of a single nickel sheet acting, once assembled the electrolyser, on one side as anodic wall delimiting the anodic compartment of one cell and on the other side as cathodic wall delimiting the cathodic compartment of the subsequent cell (single wall hereafter).

A totally equivalent situation occurs in the case of membrane water electrolysis, wherein the two solutions, anodic and cathodic, respectively consist of water and oxygen in the anodic compartment and of water and hydrogen in the cathodic compartment or, in a special process alternative, of water and oxygen in the anodic compartment and of humid hydrogen in the cathodic compartment. In both cases the construction material suited to both the anodic and cathodic conditions may be stainless steel, or preferably titanium considering its better chemical inertia.

A further situation, wherein the construction material compatible with both fluids, anodic and cathodic, may be the same, is given by hydrochloric acid electrolysis in its two variants, the conventional one with chlorine and hydrogen evolution:

$$2HCl \rightarrow H_2 + Cl_2$$

or the oxygen cathode-depolarised one:

$$4HCl + O_2 \rightarrow 2Cl_2 + 2H_2O$$

In both cases titanium and preferably some alloys thereof turn out to be compatible with the process conditions of both compartments, anodic (chlorine-containing hydrochloric acid solution) and cathodic (respectively hydrogen or oxygen with minor amounts of slightly acidic water). Thus, also in this case the bipolar plate may comprise a single sheet which during the electrolyser operation acts as anodic wall on one side and as cathodic wall on the other (see for instance U.S. Pat. No. 5,770,035).

A restraint to the adoption of the single wall bipolar plate design comes from the need of the two compartments, cathodic and anodic, to be provided with perimetrical flanges allowing to seal the same compartments, in co-operation with suitable gaskets, preventing the leakage of process fluids. In accordance with the known constructive procedures the perimetrical flanges are either obtained by moulding or by folding of the sheets constituting the compartment walls: in the case of bipolar plates comprising a pair of shells respectively destined to delimit an anodic compartment and a cathodic compartment, as happens in the case of the chlorine-caustic soda electrolysis, each wall is processed to form only its own flange and this operation gives in general satisfying results in terms of planarity and of absence of mechanical defects. Conversely in the case of bipolar plates comprising a single wall it is necessary to proceed, operating with the known procedures, to a double forming since both flanges, cathodic and anodic, are necessarily part of the same wall. The double forming, independently from the fact that it is accomplished by moulding or by folding, introduces high mechanical stresses in the material with remarkable distortions and/or frequent mechanical defects such as tears.

The problem is tackled in EP 1 366 212, where several types of perimetrical frames suitable for being used with bipolar plates comprising a single wall are described. In particular, it is proposed the use of a frame consisting of a bar or tube both with quadrangular profile, on a face of which the single wall of the bipolar element is welded, optionally in two subsequent passes in order to better ensure the absence of defects capable of releasing the process fluids to the external environment. In a further embodiment, the single wall is processed by moulding or folding so as to form a single flange, for instance the anodic flange, while the second flange, for instance the cathodic flange, is preassembled by moulding or folding of a suitable strip of identical material as that of the single wall: the preassembled cathodic flange is then secured by welding to the single wall already provided with the anodic flange. A further manufacturing alternative proposed as well in EP 1 366 212 provides that both flanges, anodic and cathodic, be preassembled in form of U-profiled frame obtained by moulding or folding of a suitable strip and that the single wall, completely planar, be secured, for instance by welding, in the middle of the frame. The problem of both manufacturing procedures is given by the need that the welds, whose linear development is remarkable, present no defect of a size such as to allow the outflow of the process fluids to the external environment. It follows that the procedure requires exasperated quality controls, moreover with the frequent intervention of the operators to eliminate the detected defects. All in all the construction turns out to be too expensive and not compatible with marketing requirements.

The above considered production cost aspect is further influenced by the securing procedures of the anodes and the cathodes, which comprise the production of the relevant supports and the execution of the required welds.

The reduction of the latter costs was considered in WO 03/038154, which proposes to obtain the supports for the anodes and cathodes directly from the single wall through the moulding of projections, for instance of prismatic shape, on both faces. The anodes and cathodes are subsequently secured on the top of the projections, for example by welding: the above described procedure allows a saving since the support material is given by the single wall and the required welds are reduced to those for securing the anodes and the cathodes on the tops of the projections getting rid of the wall to support welds, which are needed when the supports are preassembled separately, as customary in the conventional constructions. The drawback which prevents from advantageously using the manufacturing procedure of WO 03/038154 is given by the remarkable deformation undergone by the sheet of the single wall during the moulding of the projections on both faces, with the consequence of a totally unacceptable planarity for bipolar plates which have to be assembled in a high number to form the industrial electrolysers.

The survey of the prior art thus allows stating that the production of bipolar plates comprising a single wall, provided with anodic and cathodic flanges as well as of electrodes or current distributors with the relevant supports and characterised by suitable planarity and acceptable production costs on the commercial standpoint certainly represents an industrially relevant problem, with no viable solution so far.

OBJECTS OF THE PRESENT INVENTION

The present invention intends to solve the above outlined problem proposing a bipolar plate design comprising a single wall provided with flanges, anodic and cathodic, and with an anode and a cathode with the relevant supports as well as the relative manufacturing procedure characterised by a simplification both of the folding and/or moulding procedures and of the welding, and by a high quality standard as regards the planarity of the finished bipolar plate and the absence of defects capable of permitting the outflow of the process fluids to the external environment.

DESCRIPTION OF THE INVENTION

Under a first aspect, the invention consists of a bipolar plate comprising a single wall provided with anodic and cathodic flanges, wherein the flanges are formed by a preassembled frame provided with a suitable abutment surface for the single wall directed to facilitate the execution of the perimetrical fixing weld between frame and single wall.

In one embodiment of the invention, the preassembled frame has a U-profile and is obtained by moulding or folding of a suitable strip of the same material as that of the single wall.

In one alternative embodiment, the preassembled frame has a quadrangular section and is obtained by draft of a draw piece of the same material as that of the single wall.

In one preferred embodiment the perimetrical welding is carried out employing the diode-laser technique.

In one preferred embodiment only one of the two faces of the bipolar plate single wall is provided with longitudinal projections provided with an apex obtained by moulding, wherein said projections are aligned in parallel to one of the sides of the single wall itself.

In one preferred embodiment the bipolar plate comprises a first electrode or current distributor and a second electrode or current distributor respectively secured to the apexes of the projections and to strip-shaped supports positioned on the face of the single wall free of projections; the strip-shaped supports are optionally positioned in the recesses of the projections with their foot in correspondence of the apex intrados.

In one preferred embodiment of the invention the first electrode or current distributor, the apexes of the projections and the feet of the strip-shaped supports are connected by means of a first single series of fixing welds.

In one preferred embodiment of the invention the second electrode or current distributor is connected to the free terminal surfaces of the strip-shaped supports by means of a second single series of fixing welds.

In one further embodiment the apex of the projections is characterised by a planar surface of reduced size.

Under another aspect, the invention relates to an electrolyser or fuel cell stack comprising two compartments divided by a separator, optionally an ion-exchange membrane or porous diaphragm, wherein each cell is delimited by bipolar plates comprising a single wall and perimetrical flanges comprising a preassembled frame provided with planar abutment surface for the welding to the single wall.

Under a final aspect the invention relates to a manufacturing method of bipolar plates for electrolysers or fuel cells, comprising a single wall and perimetrical flanges comprising a preassembled frame provided with planar abutment surface for the welding to the single wall. In one preferred embodiment, the method comprises the steps of folding or moulding of a sheet strip and of forming a U-profiled frame with a planar abutment surface, or alternatively of extruding quadrangular elements to form a frame with closed quadrangular profile and with planar abutment surface; preassembling strip-shaped supports; moulding of projections on just one side of the wall; positioning the perimetrical edge of the single wall on the planar abutment surface of the frame and welding with diode-laser technique; optional positioning of devices for biphasic fluid circulation on said single wall and fixing by electric resistance welding, electric arc-welding or laser welding; housing of the preassembled supports in the recesses of the projections of the welded frame-single wall element, with positioning of the first electrode or current distributor in contact with the apex of said projections and execution of a single first series of welds by electric arc or laser-welding technique; positioning of the second electrode or current distributor in contact with the apex of said projections and execution of a single second series of welds by electric arc or laser-welding technique.

DETAILED DESCRIPTION OF THE INVENTION

Figure 1:
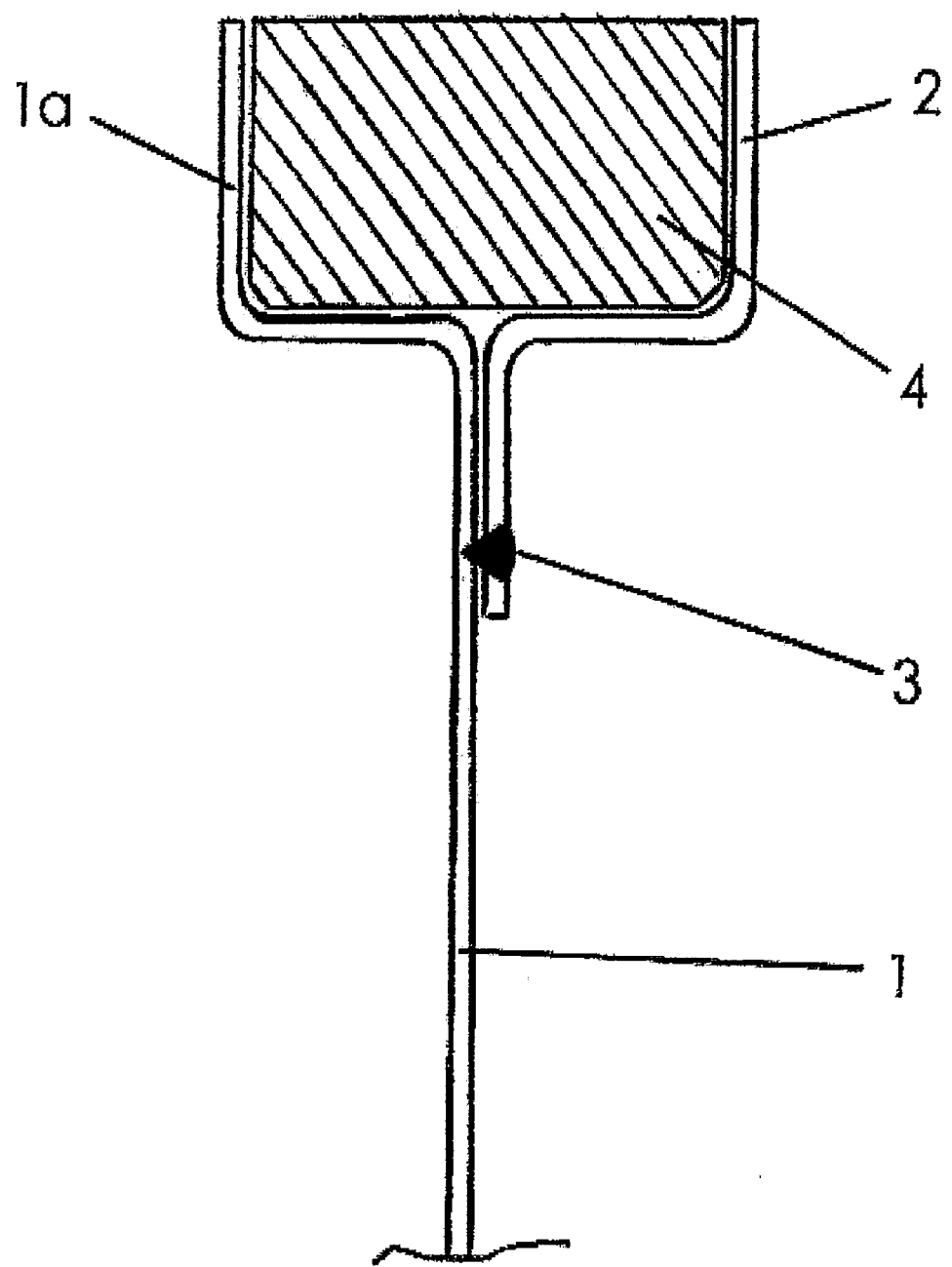
FIG. 1 sketches a portion of a cross-section of single wall bipolar plate according to one of the embodiments of the prior art, wherein the two perimetrical flanges are respectively obtained by folding or moulding of the single wall and by welding of a preassembled element by folding or moulding of a suitable strip.

FIG. 1 sketches the type of design proposed by the prior art for the construction of a single wall-bipolar plate. In particular, the first flange ($1a$) is obtained by folding or moulding of the single wall (1) itself, while the second flange (2) is prepared separately as folded or moulded preassembled element making use of a suitable strip: the preassembled element is then welded to the single wall through the perimetrical weld (3) which involves the whole thickness of the two sheets (1) and (2). The so obtained frame is finally completed with a reinforcing bar (4) of metallic material, also carbon steel for instance, or of plastic material, such as for example fibre-glass-reinforced vinyl polyester. The problem characterising this type of design derives from the presence of defects inside the weld (3): such defects may put in communication the two process fluids present in operation on the two sides of the bipolar plate, or one of the process fluids with the external environment. While the former type of defect is tolerable within certain limits, the latter type represents an utterly unfavourable occurrence. Of course, as known to the experts in the field, the welds may be checked according to several methods to identify the presence of defects capable of putting the interior of any chemical apparatus or part thereof in communication with the external environment. Such methods however slow down the production rates to a remarkable extent and finally determine a substantial increase in the production costs.

Figure 2:
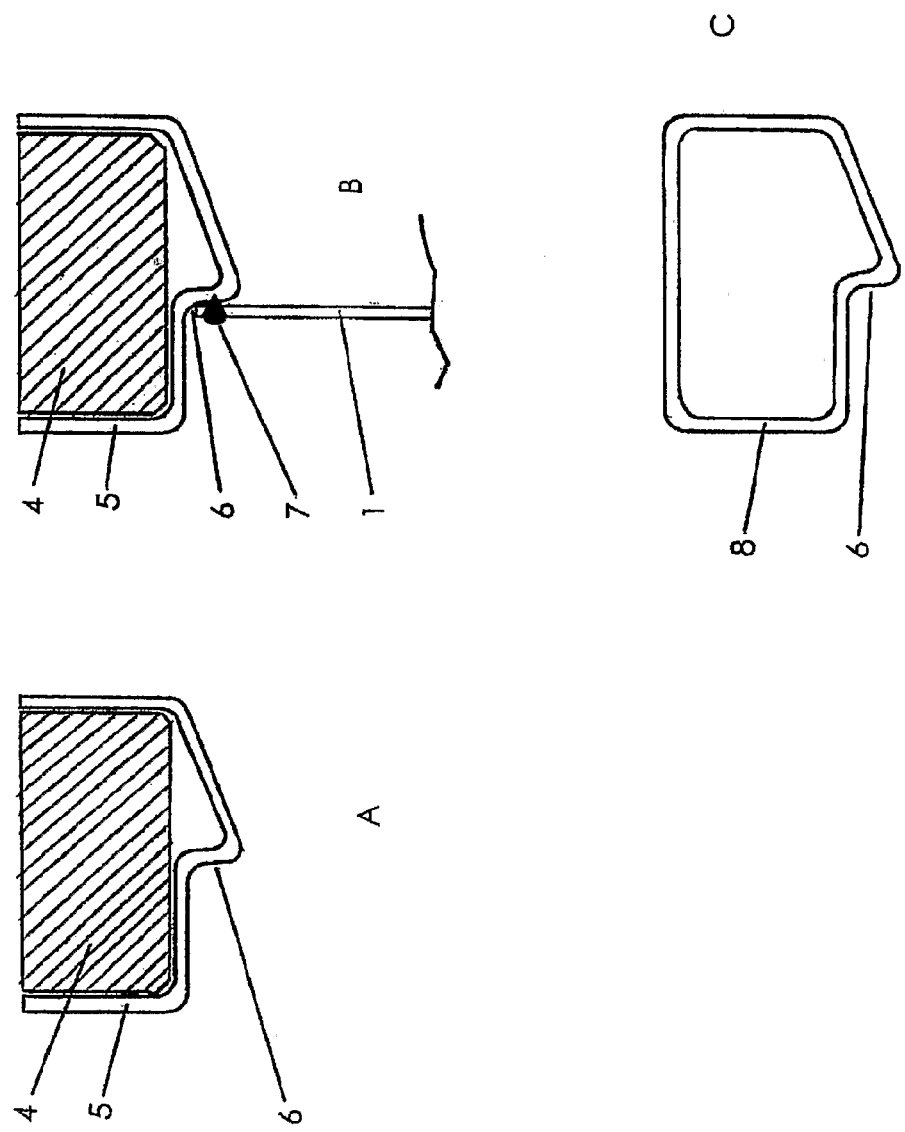
FIG. 2A shows a portion of a cross-section of a first embodiment of single wall bipolar plate of the present invention, wherein the two flanges consist of a single element preassembled in form of U-profiled perimetrical frame, where the frame, formed by folding or moulding of a suitable strip, comprises an abutment surface to facilitate the welding to the single wall.
FIG. 2B shows a section of the perimetrical frame-single wall assembly resulting from the welding of the elements of FIG. 2A.
FIG. 2C illustrates a portion of a cross-section of single wall bipolar plate according to a further embodiment of the invention, wherein the two flanges consist of a single preassembled element in form of closed perimetrical frame with quadrangular profile, where the closed frame presents an abutment surface for the welding to the single wall.

FIGS. 2A, 2B and 2C sketch the solution to the problem of weld defects proposed by the present invention. In particular, the two flanges are formed by a single U-profiled frame-shaped element (5) which acts as barrier against the external environment for the process fluids, as it consists of a continuous sheet. This barrier action might be cancelled by defects contained in the weld (7) joining the frame (5) to the single wall (1): to prevent the problem, the joining weld (7) is executed by diode-laser technique. Such a procedure is characterised by the possibility of predetermining the penetration of the fusion with high precision, even in the case of the sheets making up the assembly, characterised by thicknesses indicatively comprised between a few tenths of a millimetre and 2 millimetres: with a suitable adjustment, a weld bead (7) only partially penetrating the thickness of the frame sheet (5) is obtained, so that the latter is preserved as an effective barrier. Possible defects may only put in communication the process fluids present on the two sides of the bipolar plate: this presence cannot be excluded being inherent to the fusion welding process in itself, nevertheless it can be minimised by further adjusting the welding parameters so as to obtain a broad weld bead whose complete crossing by defects turns out to be substantially unlikely. In order to guarantee the preservation of these very favourable characteristics, the welding execution is facilitated by the peculiar profile of the frame (5) which in fact presents a planar abutment surface (6) directed to realise a regular contact with the peripheral edge of the single wall (1). In conclusion, the adoption of the frame design and of the welding procedures of the invention practically allows getting rid of the quality check procedures with a substantial saving in the production costs.

It is to be noted that the employment of the diode laser welding technique would not be decisive in the case of the frame according to the prior art design of FIG. 1: in fact, while it is true that the welding parameters may be adjusted so as to avoid the complete fusion of the sheet (1), thereby ensuring the separation of the two process fluids present on the two sides of the single wall, it is also true that the presence of possible defects contained, as mentioned before, in the weld bead cannot be excluded. Such defects, if they are of sufficient size, would put the process fluid present on the flange (2) side in contact with the external environment. It follows that in any case, even with the adoption of a specialised welding technique such as the laser-diode one, the prior art designs, of which the one of FIG. 1 is an example, would anyway require the implementation of the complex and expensive quality checks.

FIG. 2C finally sketches a further embodiment of the invention wherein the two flanges are again integrated in a single element, which however has the shape of a closed frame (8) characterised by a quadrangular profile and including again the planar abutment surface (6). In this particular embodiment, which can be obtained by continuous extrusion of quadrangular elements, the frame does not contain the reinforcing bar (4), and the required mechanical resistance to compression is ensured by a suitable thickness of the material. The hollow frame may be employed as a duct for feeding the reactants through suitable feed nozzles and suitable holes not shown in the figures.

In conclusion, the frame of the invention and the welding procedure with diode-laser technique allows reducing the manufacturing costs in a significant way because the leak checks to be carried out on the finished bipolar plates are practically eliminated and nonetheless the bipolar plates assembled in the electrolysers or stacks turn out to be practically free from defects capable of putting the process fluids in communication with the external environment.

To avoid cancelling the advantage deriving from the cost reduction of the frame-single wall assemblage it is necessary that also the costs of the subsequent assembling operations of the electrode supports and of the first and second electrode or current distributor be also limited.

A way to obtain this result is disclosed in the previously cited patent application WO 03/038154 wherein the bipolar plate single wall is provided with projections on both sides by moulding: the projections act as supports whereon the first and second electrode or current distributor are subsequently secured. In this way only two series of welds are employed in correspondence of the apexes of the projections present on the two sides of the single wall. The procedure of WO 03/038154, which also allows some advantages associated to the internal circulation of the process fluids, presents however a drawback which is difficult to overcome in the practice: the single wall, subjected to the double moulding necessary to obtain the projections on both sides, undergoes deep irreversible distortions with consequent lack of planarity and mechanical tears, which jointly cause a high percentage of rejections with a consequent critical burdening of the production costs.

Figure 7:
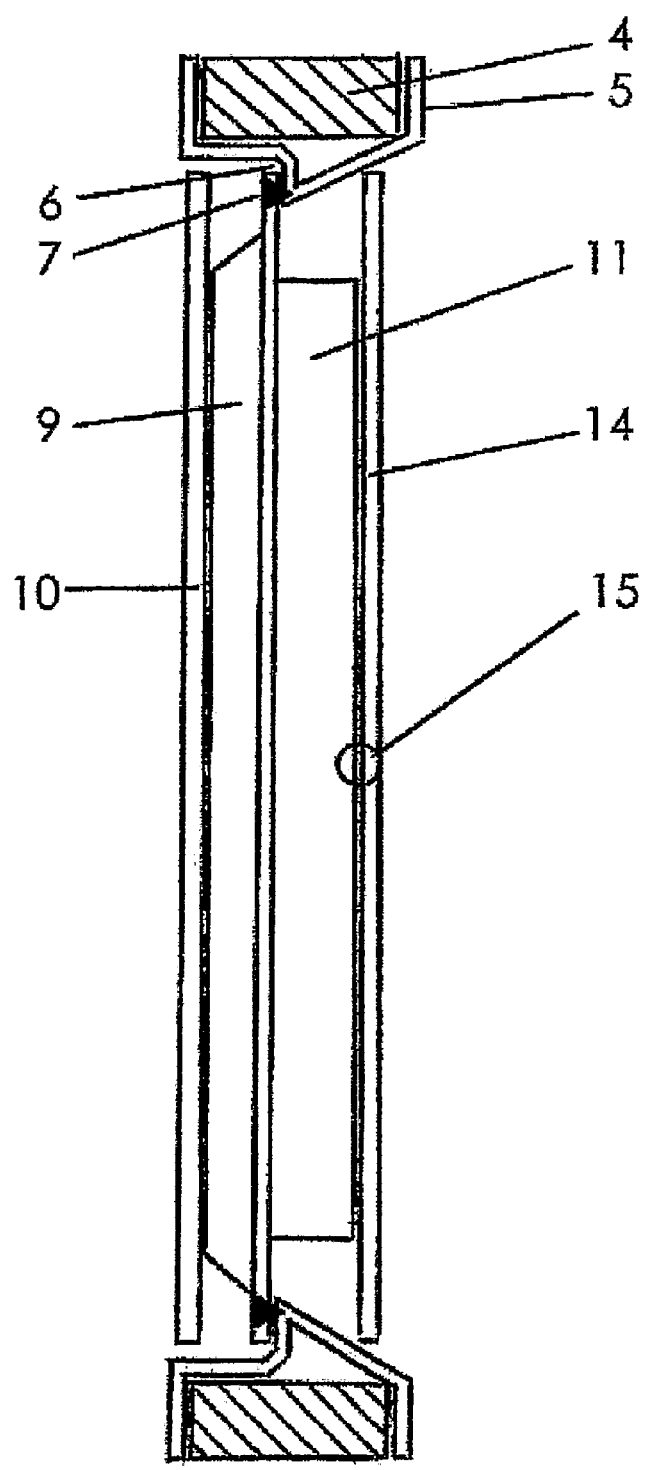
FIG. 7 finally represents the single wall bipolar plate resulting from the completion of the assembly of FIG. 5 with the second electrode or current distributor fixed to the free terminal surfaces of the supports by a second single series of welds.

On the other hand as mentioned the conventional technique, sketched in FIG. 7 of EP 1 366 212, effectively allows obtaining highly planar bipolar plates by employing strip-shaped supports whose fixing to the single wall jointly with the first and second electrode or current distributor however requires carrying out four series of welds: it is clear therefore that the assembled elements are characterised by high quality but at the expense of the costs of production which undoubtedly turn out to be remarkable.

The present invention achieves the scope of having bipolar plates of high planarity while keeping the production costs within reasonable and market-acceptable limits resorting to a hybridisation of the previously disclosed technologies.

Figure 3:
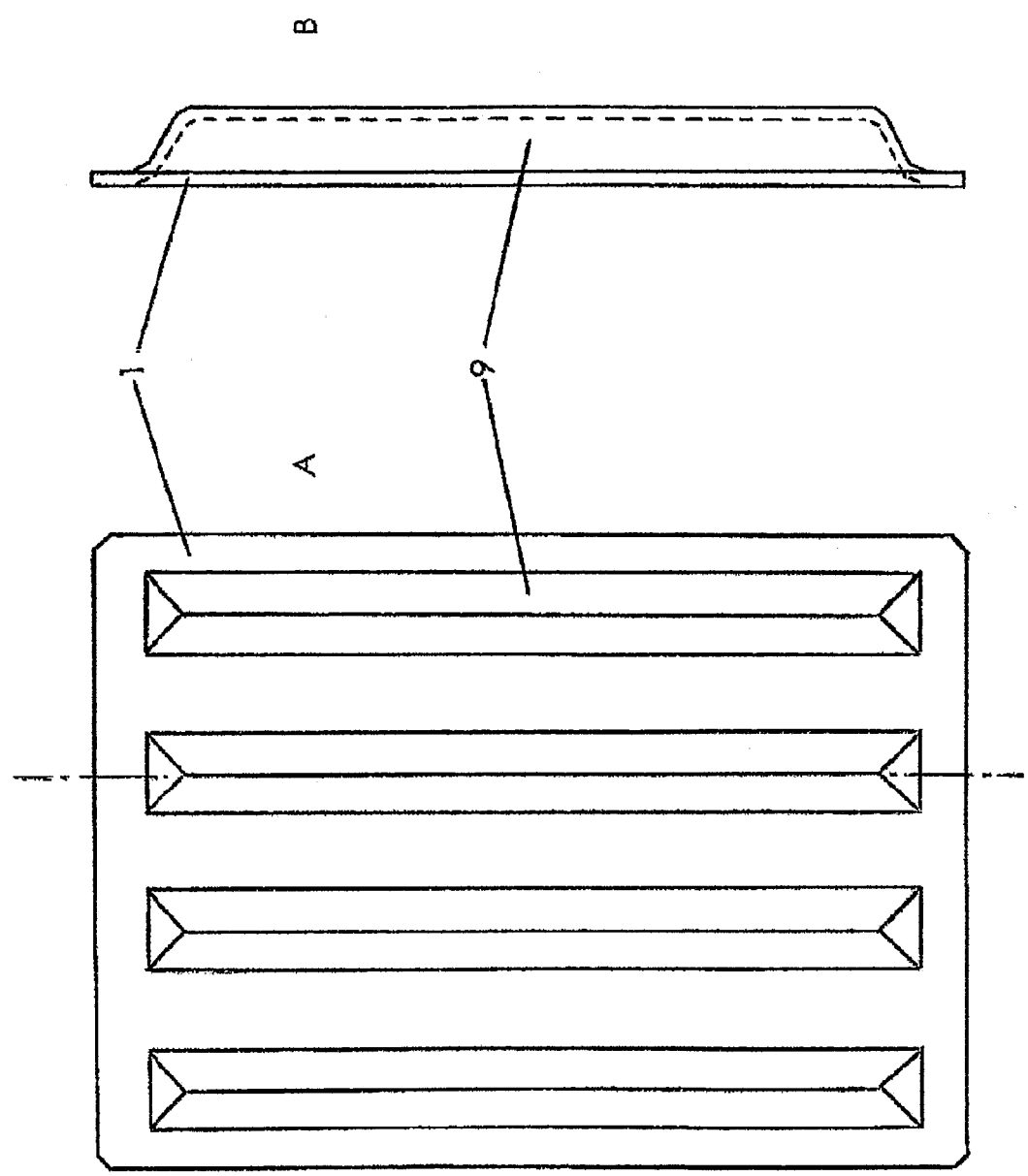
FIG. 3A represents a front-view of a possible embodiment of the single wall provided with longitudinal projections on one side only.
FIG. 3B shows the side section of the single wall of FIG. 3A along the line X-X.

FIG. 3 shows that the single wall (1) is provided with projections (9) on one side only: the moulding procedure is hence simplified with very reduced mechanical stresses. It follows that the deformations of the single wall after moulding are minimal and, if desired, easily eliminable by press rectification.

FIGS. 4A and 4B sketch how the single wall (1) is then positioned on the abutment surface (6) of the perimetrical frame (5), optionally provided with a reinforcing bar (4), to be fixed by means of the weld (7).

Figure 5:
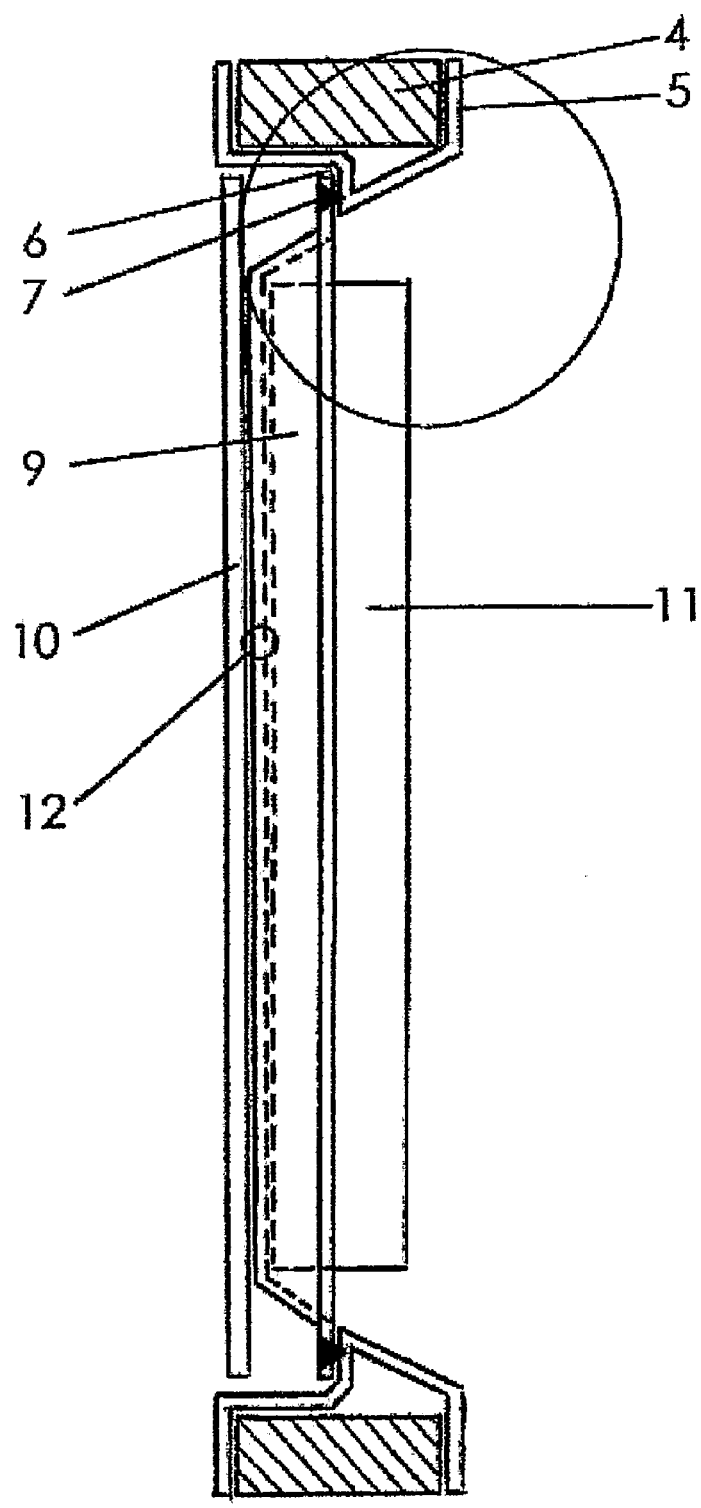
FIG. 5 shows a side section of the assembly of FIGS. 4A and 4B further provided with the first electrode or current distributor on the side of the projection apexes and of supports on the opposite side, wherein the first electrode or current distributor, the apexes and the feet of the supports are fixed with a single first series of welds.

FIG. 5 summarises the subsequent manufacturing step, in which the assembly of frame (5) and single wall (1) provided with projections (9) on one side only is equipped with a first electrode or current distributor (10) in contact with the apexes of the projections (9) and, on the side opposite the projections, with supports (11) in form of strips housed in the recesses of the projections: the mutual fixing of the three components (first electrode or current distributor (10), apexes of the projections (9) and supports (11)) is carried out through a single series of welds schematically indicated as (12). The best result in terms of mechanical stiffness, electric current conduction in operation and absence or in any case minimum number of defects is obtained making use of the laser welding technique for instance with a carbon dioxide-laser whose high fusion penetration allows securing the above seen components simultaneously. The supports (11) are positioned inside the projections (9) in contact with the apex intrados, which presents a planar portion to favour the contact with the foot of the same supports. The developing of the planar surface of the projection (9) apexes is limited to what required to achieve a good bearing seat for the support feet, in order to avoid that, during operation, the electrode or distributor (10) become the site for shielding phenomena, which are hazardous in particular for the integrity of the ion-exchange membranes, if they are in contact with the first electrode fixed to the projections, or for the reaction gas diffusion, if gas diffusion electrodes are employed, in this case positioned on the first current distributor fixed to the projections. The supports (9) consist of sheet strips with a thickness indicatively comprised between 1 and 5 millimetres. The optimal thickness of the supports strips is the result of a compromise between the two needs of conducting the electric current in the best possible fashion (high thicknesses) and of preventing the same shielding zone-formation phenomenon seen in the case of the first electrode or current distributor, in correspondence of the junction areas with the second electrode or current distributor (low thicknesses).

Figure 4:
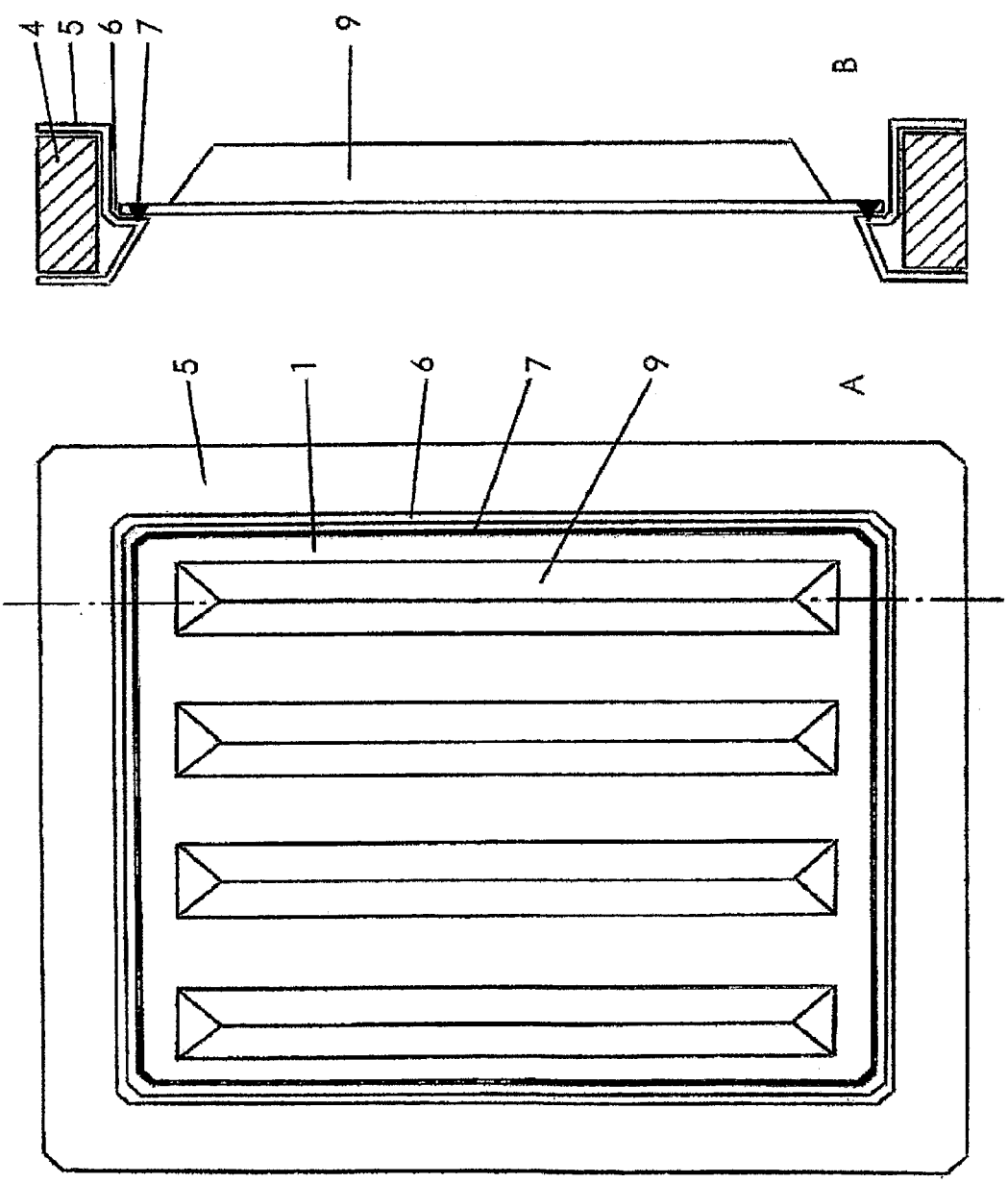
FIG. 4A sketches a front-view of the assembly resulting from the welding of the frame of FIG. 2A with the single wall of FIG. 3A according to the manufacturing scheme of FIG. 2B.
FIG. 4B illustrates the side section of the assembly of FIG. 4A along the line Y-Y.

In FIGS. 4 and 5 a preferred embodiment of the invention is represented, wherein the projections (9) have a prismatic shape with slightly lower length than the single wall, so as to facilitate the positioning of the supports (11) inside the same projections. It is of course also possible to produce projections consisting of aligned segments which have the merit of favouring the reaction fluid mixing in operation: in this case, the supports are fractioned as well in segments of length such that an easy housing of each segment inside each series of projections is permitted.

Figure 6:
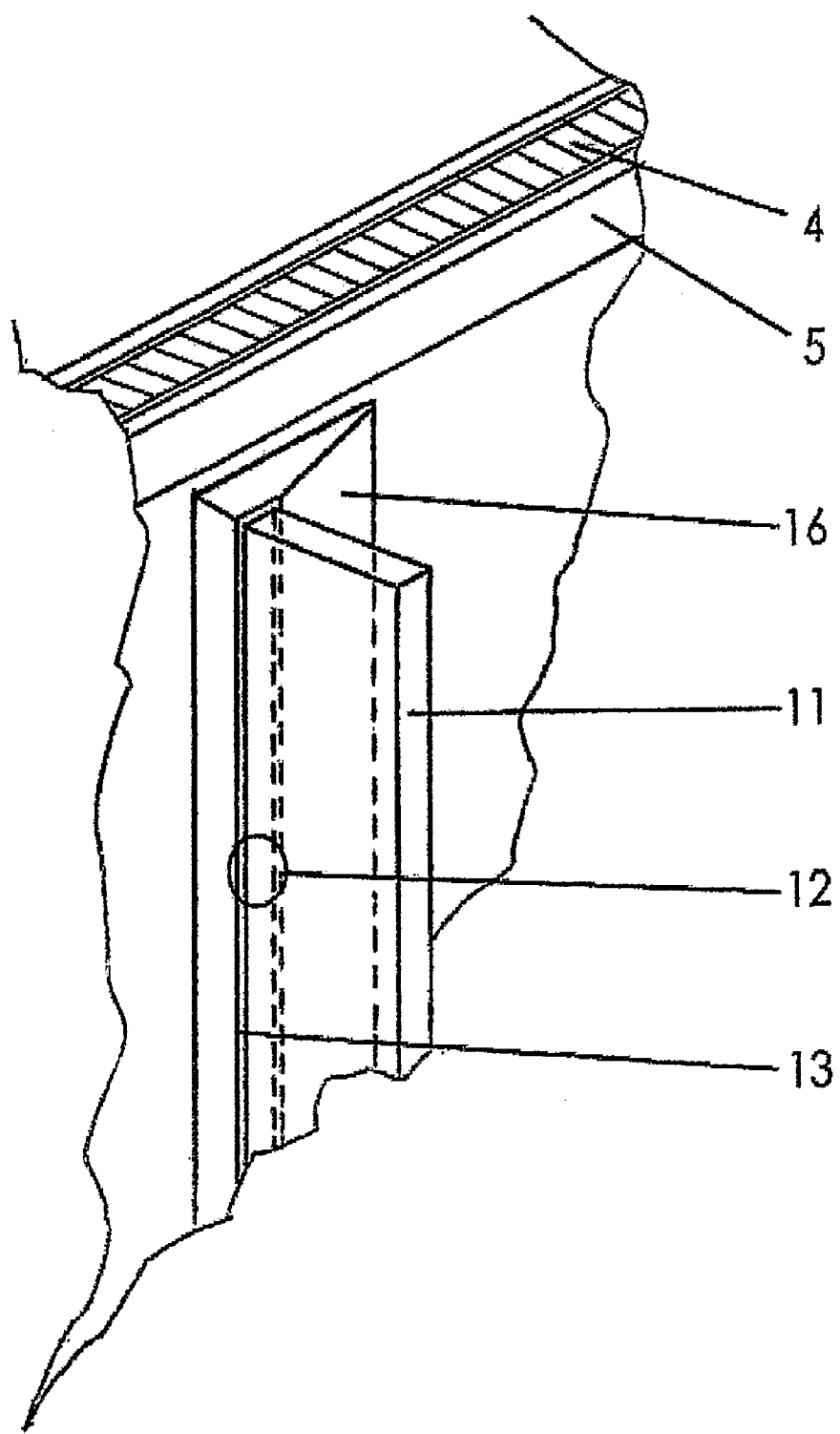
FIG. 6 reproduces in a three-dimensional scheme a detail of the assembly of FIG. 5 with a side-view of the support, opposite to the side provided with first electrode or current distributor.

FIG. 6 shows a three-dimensional detail of the assembly of FIG. 5 (zone delimited by a circle) with a view from the side of the supports opposite the side wherein the first electrode or current distributor is in contact with the apexes of the projections: (4) indicates the reinforcing bar, (5) the perimetrical frame moulded in a single piece of strip, (16) the internal surface of projections (9), (11) the strip-shaped support whose foot in contact with the planar portion (13) of the projection apex is secured by the first series of welds (12).

In FIG. 7 it is shown the completion of the element of FIG. 5 with the attainment of the bipolar plate in accordance with the invention: the second electrode or current distributor (14) is put in contact with the free terminal surfaces of the supports (11) and is secured by a single second series of welds (15), which may be carried out by various procedures, for instance by electrical resistance, electric arc and preferably laser in consideration of the higher speed.

In order that the various types of weld seen above present the required quality it is also necessary that the various components of the bipolar plate of the invention be maintained in a precise contact condition during the whole time of manufacturing. For this purpose the various components, frame and single wall during the step of execution of the fixing weld (7), first electrode or current distributor (10), single wall (1) fixed to the perimetrical frame (5) and supports (11) during the step of execution of the first single series of welds (12), and finally element obtained by means of the first single series of welds and second electrode or current distributor (14), should be accurately blocked within a suitable construction template.

As regards the dimensions of the bipolar plate of the invention, the height of the projections and supports is selected in the simplest case so that the distance of the two electrodes or current distributors from the single wall surface results the same. This type of symmetrical design is employed for instance for the production of bipolar plates directed to be assembled in electrolysers for the conventional electrolysis of hydrochloric acid solutions and for the water electrolysis with potassium hydroxide solutions: in these cases the construction materials for the single wall provided with projections, for the supports and for the electrodes or current distributors are respectively titanium or alloys thereof and nickel. In both cases the solutions contain the product gases (respectively chlorine-hydrogen, and oxygen-hydrogen) as bubble dispersion: to favour the circulation of the biphasic fluids, a suitable depth of the anodic and cathodic compartments is required and therefore the projections and supports are dimensioned so as to achieve a surface distance of single wall—electrode or current distributor indicatively comprised between 30 and 50 millimetres. Optionally, one or both of the compartments, anodic and cathodic, may be equipped with devices directed to further promote the biphasic fluid circulation and to accelerate the gas bubble coalescence and the separation thereof from the liquid. Similar devices, such as channel and planar flow deflectors installed in a suitable position on one or both faces of the bipolar plate single wall, are for instance disclosed in WO 03/048420.

The bipolar plate of the invention can be advantageously used also for assembling electrolysers directed to the electrolysis of hydrochloric acid solutions and equipped with oxygen diffusion cathodes wherein, much as in the case of the conventional electrolysis, the construction material for the single wall provided with projections, supports and electrodes or current distributors is titanium or alloys thereof. The design can be modified in an interesting fashion: in fact if the oxygen diffusion cathode is installed on the side of the single wall provided with projections, the height of the latter is advantageously reduced since the process fluid on this side is oxygen or air which, being a gaseous phase, requires an entirely modest compartment width. It follows that the moulding operation is very simplified and that the single wall, subjected to moderate deformations, turns out being substantially planar without the need of subsequent straightening interventions. In particular, the single wall—electrode or current distributor distance is comprised between 5 and 10 millimetres. Moreover the moderate moulding stresses eliminate completely the possibility of generating those tears which are conversely a frequent event during the moulding of the projections of WO 03/038154.

The other (anodic) side of the single wall is in contact with the hydrochloric acid solution containing a dispersion of chlorine bubbles: the correct circulation of this biphasic mixture requires that the compartment have an adequate depth and the supports are therefore designed with a height such that it ensures an electrode (anode)—single wall surface distance comprised between 30 and 50 millimetres as seen above.

The bipolar plate of the invention is also usable for the construction of membrane fuel cell assemblies (known as stacks). Since in this kind of cells the process fluids are air on the cathode side and hydrogen or hydrogen-containing mixture on the anode side, the depth of both compartments, only crossed by gaseous phases, can be modest: it follows that the projections and likewise the supports have reduced heights (with the above seen advantages), with a single wall—electrode or current distributor distance even lower than 5 mm on both sides, anodic and cathodic.

In all the above disclosed applications of electrolysers or stacks comprising a multiplicity of bipolar plates of the invention a deterioration of the electrodes or current distributors, which must therefore be replaced with new components, takes place after a certain operating time. In the case of the second electrode or current distributor the replacement is carried out by eliminating the securing welds to the supports, for instance by grinding, and by welding the new replacement piece to the freed terminal surfaces of the supports. This procedure in general is to be avoided for the first electrode or current distributor since the risks of damaging the thin sheet of the projections is too high: a preferable alternative procedure provides that a new electrode or current distributor, thinner than the damaged one, be secured by welding, for instance by the cheap resistance spot-welding. The first damaged electrode or current distributor, which is then left in place, favours the homogeneous current distribution to the new thinner piece.

The structure of the bipolar plate of the invention and the relevant assembly procedure of the various constituent elements justify the above given definition of hybridisation: in fact, the bipolar plate structure of the invention makes use advantageously of the projections moulded on the single wall and of the strip-shaped supports of the prior art mutually combining the same in a novel fashion. The disclosed combination allows assembling the components (first and second electrode or current distributor, single wall with projections on one side only and strip-shaped supports) with just two series of welds, obtaining the same economical advantages of the welding process of WO 03/038154, while avoiding to resort to excessively difficult moulding operations.

In the descriptions contained in the present text, reference has been made to some preferred embodiments, nevertheless it is clear to those skilled in the art that several modifications are possible without departing from the scope of the invention, which is solely defined and limited by the following claims.

The invention claimed is:

1. A bipolar plate for electrochemical cells comprising a first and a second compartment divided by a separator and respectively containing a first and a second electrode or current distributor, said bipolar plate comprising a single wall, perimetrical flanges and means for feeding reactants and extracting products, said perimetrical flanges comprising a preassembled frame provided with a planar abutment surface for welding with said single wall, wherein said single wall is provided with projections on one side only and of supports on the side opposite to that of the projections, the bipolar plate wherein said projections are longitudinal projections parallel to one side of the bipolar plate.

2. The bipolar plate of claim 1 wherein said welding between said planar abutment surface of the frame and said single wall is a diode laser welding.

3. The bipolar plate of claim 1 wherein said frame has a generally U-shaped profile.

4. The bipolar plate of claim 1 wherein said frame has a quadrangular closed profile.

5. The bipolar plate of claim 1 wherein said means for feeding reactants consists of said preassembled frame, provided with a multiplicity of distributing holes.

6. The bipolar plate of claim 1 wherein said projections are continuous projections having a length slightly lower than the length of said side.

7. The bipolar plate of claim 1 wherein said supports are strips of sheet comprising a foot housed in the recesses of said projections.

8. The bipolar plate of claim 1 wherein said first electrode or current distributor is in contact with the apexes of said projections.

9. The bipolar plate of claim 8 wherein said first electrode or current distributor, said projection apexes in contact therewith and the feet of said supports are connected through a single first series of welds.

10. The bipolar plate of claim 9 wherein said single first series of welds comprises electrical resistance welds or electric arc welds or laser welds.

11. The bipolar plate of claim 1 wherein said second electrode or current distributor is in contact with the free terminal surfaces of said supports.

12. The bipolar plate of claim 11 wherein said second electrode or current distributor and said free terminal surfaces of the supports are connected through a single second series of welds.

13. The bipolar plate of claim 12 wherein said single second series of welds comprises electrical resistance welds or electric arc welds or laser welds.

14. The bipolar plate of claim 1 wherein said projections have an apex provided with a planar surface of low width.

15. The bipolar plate of claim 1 wherein the distances between said first and second electrode or current distributor and said single wall are equal.

16. The bipolar plate of claim 15 wherein said distances are comprised between 5 and 50 millimeters.

17. The bipolar plate of claim 1 wherein the distance between said first electrode or current distributor and said single wall is lower than the distance between said second electrode or current distributor and said single wall.

18. The bipolar plate of claim 17 wherein said distances are respectively comprised between 5 and 50 millimeters and between 30 and 50 millimeters.

19. The bipolar plate of claim 1 wherein said single wall is provided with devices for improving the circulation of biphasic fluids.

20. An electrolyzer comprising a multiplicity of elementary cells comprising bipolar plates of claim 1.

21. The electrolyzer of claim 20 wherein peripheral sealing gaskets and separators are intercalated between adjacent pairs of said bipolar plates.

22. The electrolyzer of claim 21 wherein said separators are ion-exchange membranes or porous diaphragms.

23. A stack comprising a multiplicity of fuel cells comprising bipolar plates of claim 1.

24. The stack of claim 23 wherein peripheral sealing gaskets and separators are intercalated between adjacent pairs of said bipolar plates.

25. The stack of claim 24 wherein said separators are ion-exchange membranes or porous diaphragms.

26. A method for the manufacturing of the bipolar plate of claim 13 comprising the steps of:

folding or molding of a sheet strip to form said frame with U-shaped profile and with planar abutment surface or by drafting of quadrangular elements to form said frame with closed quadrangular profile and with planar abutment surface preassembled of said strip-shaped supports molding of said projections on one side only of said single wall positioning of the perimetrical edge of said single wall on the planar abutment surface of said frame and welding with diode laser technique optional positioning of devices for improving the circulation of biphasic fluids on said single wall and fixing by electric resistance welding, or electric arc welding or laser welding housing of said preassembled supports in the recesses of said projections of the welded frame—single wall element, positioning of said first electrode or current distributor in contact with the apex of said projections and execution of said first single series of welds by electric arc welding or laser welding technique positioning of said second electrode or current distributor in contact with the free terminal surfaces of said supports and execution of said second single series of welds by electric resistance welding or electric arc welding or laser welding technique.

* * * * *